United States Patent
Pon (10) Patent No.: US 7,965,230 B2
(45) Date of Patent: Jun. 21, 2011

(54) SATELLITE TIME DETERMINATION FOR SPS RECEIVER

(75) Inventor: Rayman Wai Pon, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 12/337,370

(22) Filed: Dec. 17, 2008

(65) Prior Publication Data

US 2009/0219202 A1    Sep. 3, 2009

Related U.S. Application Data

(60) Provisional application No. 61/032,852, filed on Feb. 29, 2008.

(51) Int. Cl.
*G01S 19/42* (2010.01)
(52) U.S. Cl. .................................. 342/357.25
(58) Field of Classification Search ............... 342/357.2, 342/357.21, 357.25, 357.26, 357.46, 357.47; 701/207, 213; 375/150
See application file for complete search history.

(56) References Cited

U.S. PATENT DOCUMENTS

| | | | | |
|---|---|---|---|---|
| 6,856,282 | B2 * | 2/2005 | Mauro et al. | 342/357.42 |
| 6,952,440 | B1 * | 10/2005 | Underbrink | 375/150 |
| 7,450,063 | B2 | 11/2008 | Kangas | |
| 2003/0227963 | A1 * | 12/2003 | Dafesh | 375/149 |
| 2008/0079633 | A1 * | 4/2008 | Pon et al. | 342/357.12 |

FOREIGN PATENT DOCUMENTS

WO    WO02059634    8/2002

OTHER PUBLICATIONS

International Search Report and Written Opinion—PCT/US2008/087937, International Search Authority—European Patent Office—Sep. 7, 2009.

* cited by examiner

*Primary Examiner* — Dao L Phan
(74) *Attorney, Agent, or Firm* — Andrea L. Mays; Thien Nguyen (57) ABSTRACT

Methods and apparatus for improving position location performance, especially in weak coverage areas, are described herein. A SPS receiver is able to solve for position location in situations where at least two satellite signals can be received but only one time stamp can be successfully demodulated. The receiver can utilize the successfully decoded time reference to determine a time associated with bit edge transitions for signals from that satellite. The receiver utilizes the bit edge transition with the known time to set the time for at least one bit edge transition for signals from other satellites for which the time stamp is not demodulated. The receiver sets the time hypothesis to bit edge transitions occurring within a predetermined window including the bit edge transition with the known time. A position can be determined based on the time hypothesis. The time hypothesis and window placement can be modified following invalid position solutions.

29 Claims, 7 Drawing Sheets

SATELLITE TIME DETERMINATION FOR SPS RECEIVER

CROSS-REFERENCES TO RELATED APPLICATIONS

This application claims the benefit of U.S. Provisional Application No. 61/032,852, filed Feb. 29, 2008, and entitled "IMPLIED TIME SETTING FOR GPS RECEIVER," hereby incorporated by reference herein in its entirety.

BACKGROUND

Many wireless communication systems utilize direct sequence spread spectrum to communicate information. The codes used to spread a signal are typically pseudo random codes. A receiver typically recovers the underlying information by correlating the spreading code with a locally generated code.

A receiver can sometimes utilize a time offset associated with the codes to establish a timing reference that can be used to perform position location. Determining position based on timing established from pseudo random spread signals is performed in various position location systems.

The Global Positioning System (GPS) navigation system is an example of a Satellite Positioning System (SPS) that employs satellites that are in orbit around the Earth. Any user of GPS, anywhere on Earth, can derive precise navigation information including 3-dimensional position, 3-dimensional velocity, and time. The GPS system includes up to 32 satellites that are deployed in circular orbits with radii of 26,600 kilometers in six planes inclined at 55° with respect to the equator and spaced 120° with respect to one another. Typically four to six satellites are equally spaced within each of the six orbit planes. Position measurements using GPS are based on measurements of propagation delay times of GPS signals broadcast from the orbiting satellites to a GPS receiver. Normally, reception of signals from 4 satellites is required for precise position determination in 4 dimensions (latitude, longitude, altitude, and time). Once the receiver has measured the respective signal propagation delays, the range to each satellite is calculated by multiplying each delay by the speed of light. Then, the location and time are found by solving a set of four equations with four unknowns incorporating the measured ranges and the known locations of the satellites. The precise capabilities of the GPS system are maintained by means of on-board atomic clocks for each satellite and by ground tracking stations that continuously monitor and correct satellite clock and orbit parameters.

Each GPS satellite transmits at least two direct-sequence-coded spread spectrum signals in the L-band. An L1 signal at a carrier frequency of 1.57542 GHz, and an L2 signal at 1.2276 GHz. The L1 signal consists of two phase-shift keyed (PSK) spread spectrum signals modulated in phase quadrature. The P-code signal (P for precise), and the C/A-code signal (C/A for coarse/acquisition). The L2 signal contains only the P-code signal. The P and C/A codes are repetitive pseudo-random sequences of bits (also referred to as "chips") that are modulated onto the carriers. The clock-like nature of these codes is utilized by the receiver in making time delay measurements. The codes for each satellite are unique, allowing the receiver to distinguish which satellite transmitted a given code, even though they are all at the same carrier frequency. Also modulated onto each carrier is a 50 bit/sec data stream that contains information about system status and satellite orbit parameters, which are needed for the navigation calculations. The P-code signals are encrypted, and are not generally available for commercial and private users. The C/A signal is available to all users.

The operations performed in a GPS receiver are for the most part typical of those performed in any direct-sequence spread spectrum receiver. The spreading effect of the pseudo-random code modulation must be removed from each signal by multiplying it by a time-aligned, locally-generated copy of the code, in a process known as de-spreading. Since the appropriate time alignment, or code delay, is unlikely to be known at receiver start-up, it must be determined by searching during the initial "acquisition" phase of a GPS receiver's operation. Once determined, proper code time-alignment is maintained during the "tracking" phase of GPS receiver operation.

Once the received signal is de-spread, each signal consists of a 50 bit/sec PSK signal at an intermediate carrier frequency. The exact frequency of this signal is uncertain due to the Doppler effect caused by relative movement between satellite and terminal unit, and to local receiver GPS clock reference error. During initial signal acquisition this Doppler frequency must also be searched for, since it is usually unknown prior to acquisition. Once the Doppler frequency is approximately determined, carrier demodulation proceeds.

After carrier demodulation, data bit timing is derived by a bit synchronization loop and the data stream is finally detected. A navigation calculation may be undertaken once the signals from four satellites have been acquired and locked onto, the necessary time delay and Doppler measurements have been made, and a sufficient number of data bits (enough to determine the GPS time reference and orbit parameters) have been received.

One drawback of the GPS system for location determination, and in general most SPS systems, is the long time needed for the initial signal acquisition phase. As mentioned above, before the four satellite signals can be tracked they must be searched for in a two-dimensional search "space", whose dimensions are code-phase delay, and Doppler frequency shift. Typically, if there is no prior knowledge of a signal's location within this search space, as would be the case after a receiver "cold start", a large number of code delays (about 2000) and Doppler frequencies (perhaps 15 or more) must be searched for each satellite that is to be acquired and tracked. Thus, for each signal, up to 30,000 or more locations in the search space must be examined. Typically these locations are examined one-at-a-time sequentially, a process which can take several minutes. The acquisition time is further lengthened if the identities (i.e., PN-codes) of the four satellites within view of the receiving antenna are unknown.

In the case where a SPS receiver has already acquired the satellite signals and is then in tracking mode, the position determination process can typically be performed in a time frame that is much less than the time frame required for initial acquisition. However, in the routine use of wireless terminals, users turn the power on and quickly begin operation. This may be the case when an emergency communication is intended. In such situations, the time delay associated with a several minute SPS satellite signal acquisition cold-start by a SPS/wireless terminal unit before a position fix can be obtained limits the response time of the system.

Thus, a need remains for a system and method for improving the ability to determine the time associated with SPS satellite signals and render a position fix in a SPS/wireless terminal unit.

SUMMARY

Methods and apparatus for improving SPS position location performance. The methods and apparatus described herein can be used to improve a time to fix of a position determined by the SPS, and contribute to the ability to determine a position fix in weak, obscured, or other challenging coverage areas. A SPS receiver is able to solve for position location in situations where two to four or more satellite signals can be received but only one satellite time can be successfully demodulated. The receiver can utilize the successfully decoded time reference to determine a time associated with bit edge transitions for signals from that satellite. The receiver utilizes the bit edge transition from the satellite with the known time to set the time for at least one bit edge transition for signals from other satellites for which the time is not demodulated. The receiver sets the time to bit edge transitions occurring within a predetermined window including the bit edge transition with the known time. A position can be determined based on the time. The un-demodulated satellite times and window placement can be modified following invalid position solutions hypotheses.

Aspects of the invention include a method of position location in a wireless device. The method includes receiving a pseudo noise code spread signal from each of at least two satellite vehicles, determining a bit transition edge timing for each pseudo noise code spread signal, determining a time reference for at least one of the pseudo noise code spread signals, and determining a position location solution for the wireless device based on the time reference and bit transition edge timing for the pseudo noise code spread signal from each of the at least two satellite vehicles.

Aspects of the invention include a method of position location in a wireless device. The method includes receiving a pseudo noise code spread signal from each of at least two Satellite Positioning System (SPS) satellite vehicles, determining a bit transition edge timing for each pseudo noise code spread signal, determining a time reference for a first pseudo noise code spread signal, determining a time associated with a first bit transition for the first pseudo noise code spread signal, configuring a time window that captures the first bit transition for the first pseudo noise code spread signal and at least one bit transition from a second pseudo noise code spread signal for which a time reference is unknown, generating a time hypothesis for the at least one bit transition from the second pseudo noise code spread signal, determining a position location solution for the wireless device based on the time associated with the first bit transition and the time hypothesis for the at least one bit transition from the second pseudo noise code spread signal, and validating the position location solution.

Aspects of the invention include a method of position location in a wireless device. The method includes determining timing of bit edge transitions for each of a plurality of SPS signals, determining a time reference for at least one bit edge transition, generating a time hypothesis for the plurality of bit edge transitions based on the time hypothesis and the time reference, and determining a position location solution based on the time hypothesis.

Aspects of the invention include a position location apparatus within a wireless device. The apparatus includes a receiver configured to receive a plurality of pseudo noise code spread signals from a plurality of SPS satellite vehicles, a correlator configured to determine a timing of bit edge transitions from each of the plurality of pseudo noise code spread signals, a timing message decoder configured to determine a time reference for at least one of the pseudo noise code spread signals, a hypothesis selector configured to determine a time for a bit edge from each of the plurality of pseudo noise code spread signals, and a position solution module configured to determine a position location solution based on the time reference and the time hypothesis for the bit edge from each of the plurality of pseudo noise code spread signals.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Methods and apparatus for determining a Satellite Positioning System (SPS) position solution based on acquiring as few as one time reference for a pseudo noise code spread signal for a satellite vehicle are described herein. A SPS receiver can receive two or more pseudo noise code spread signals from satellite vehicles, and can correlate the signals with locally generated pseudo noise code sequences to determine the identities of the satellite vehicles, and to determine the relative bit edge transition timing for each of the signals. The receiver can demodulate as few as one of the satellite signals to determine a time reference from which the associated timing of the bit edge transitions can be determined.

Although the GPS system is used here for purposes of discussion, it will be recognized that a SPS can include other satellite positioning systems such as the GLONASS system operated by Russia, the Galileo system under development by the European Union, and global satellite navigation projects such as the COMPASS system scheduled for future deployment by China.

Additionally, a SPS can include a Regional Navigational Satellite System, which serves a particular geographic region ("coverage area") defined by the orbits of its particular satellites. For example, a RNSS can include the Wide Area Augmentation System (WAAS) covering the United States, the Euro Geostationary Navigation Overlay Service (EGNOS) covering Europe and surrounding areas, the MTSAT Satellite-based Augmentation System (MSAS) serving Japan, and the Quasi-Zenith Satellite System (QZSS). It will be understood that a RNSS can also include other regional satellite systems such as the GPS Aided Geo Augmented Navigation (GAGAN) and Indian Regional Navigation Satellite System (IRNSS) systems under development by India and other like systems. Where the methods and apparatus described herein rely on or otherwise utilize signals from SPS satellite vehicles, the SPS satellite vehicle signals may originate from a single SPS or a combination of SV's from a plurality of SPS.

The receiver, having knowledge of the timing of the bit edge transitions for one satellite and the relative timing of the bit edge transitions for the other satellites, can configure a time window having a predetermined duration and position the time window to include at least one bit edge transition having known timing. The receiver can examine a hypothesis in which the time of bit edge transitions in the time window are set based on the bit edge transition having known timing.

The receiver can attempt a position fix with the time setting of the hypothesis and validate the position solution. The solution can be validated by examining the position solution and parameters associated with the position solution against one or more predetermined constraints. A position solution that satisfies all constraints is considered a valid position solution.

A position solution that fails to satisfy some predetermined number of constraints can be considered an invalid position solution. The receiver can reposition the time window and can update the timing hypothesis in response to an invalid position solution. A position solution is again attempted and validated. The receiver can repeat the process of repositioning the time window, updating the timing hypothesis, and attempting a position solution until a valid position solution is produced or all distinct time window configurations and timing hypothesis have been attempted.

The ability to demodulate more than one time reference from associated satellite signals reduces the number of distinct time window configurations, and thus reduces the total number of timing hypothesis that need to be tested before determining a valid solution or exhausting all possibilities.

In a general case, the receiver requires signals from at least four distinct SPS satellite vehicles when the receiver is configured to determine a three dimensional position fix based solely on signals from SPS satellite vehicles. The receiver may be able to determine a position fix using signals from fewer than four distinct SPS satellite vehicles under conditions that are more limited than the general case.

A receiver can determine a position fix using signals from as few as three distinct SPS satellite vehicles with additional knowledge relating to position or system timing. For example, if the receiver has knowledge of altitude, assumes an altitude, or otherwise only needs to determine a two-dimensional position fix, the receiver may only need signals from three distinct SPS satellite vehicles. Additionally, the receiver may determine a position using signals from as few as three distinct SPS satellite vehicles where the receiver has no initial position knowledge, but has knowledge of SPS system time. The receiver may have knowledge of SPS system time, for example, through prior time resolution determined in prior position fixes, using a local clock that is locked to system time, by receiving system time information from an external source, and the like, or some combination thereof.

The receiver may be able to determine a position fix using signals from as few as two distinct SPS satellite vehicles where the receiver has knowledge or otherwise assumes an altitude in combination with knowledge of pseudoranges and Doppler for the two satellite vehicles for the position calculation.

In general, the receiver needs to obtain sufficient information to solve for three-dimensional position unknowns (x, y, and z in a Cartesian coordinate system), and system time. The receiver can reduce the number of distinct SPS satellite vehicle signals required to determine a position solution where one or more of the three-dimensional position or system time are known or otherwise capable of independent determination.

The receiver need only determine or otherwise derive the timing of the bit edge transitions for one satellite vehicle in each of the above situations in order to determine a valid three-dimensional position fix. The timing of the bit edge transitions for the signals from the one or more additional satellites can be determined based on hypothesis testing in combination with any additional position relevant information or parameter, such as altitude, pseudorange and Doppler, or some other parameter.

The functionality of the SPS receiver is improved because of the ability to determine a valid position fix when in the presence of only one satellite vehicle signal with sufficient signal quality to demodulate the time reference. The remaining satellite signals needed for a position fix can be relatively weak signals, where only the ability to determine the bit edge transitions is needed. The ability to determine a successful position solution remains valid regardless of any initial position uncertainty. Thus, the methods and apparatus may be implemented in global roaming devices where an initial position uncertainty may be large or otherwise unknown, but where satellite ephemeris data may be readily received or determined. The time to first fix, yield, and accuracy of the SPS receiver is improved due to the ability to utilize signals from weak satellite vehicles. The ability to determine a successful position solution can be especially helpful in situations where aiding data or initial assumptions are inaccurate, such as information received in a country based assistance table.

Further, the ease of obtaining the position solution permits the disclosed methods and apparatus to be utilized as a verification position determination made by other location techniques. The methods and apparatus can be performed in a standalone SPS receiver, such as a personal navigation device, and do not require receipt of assistance data.

Figure 1:
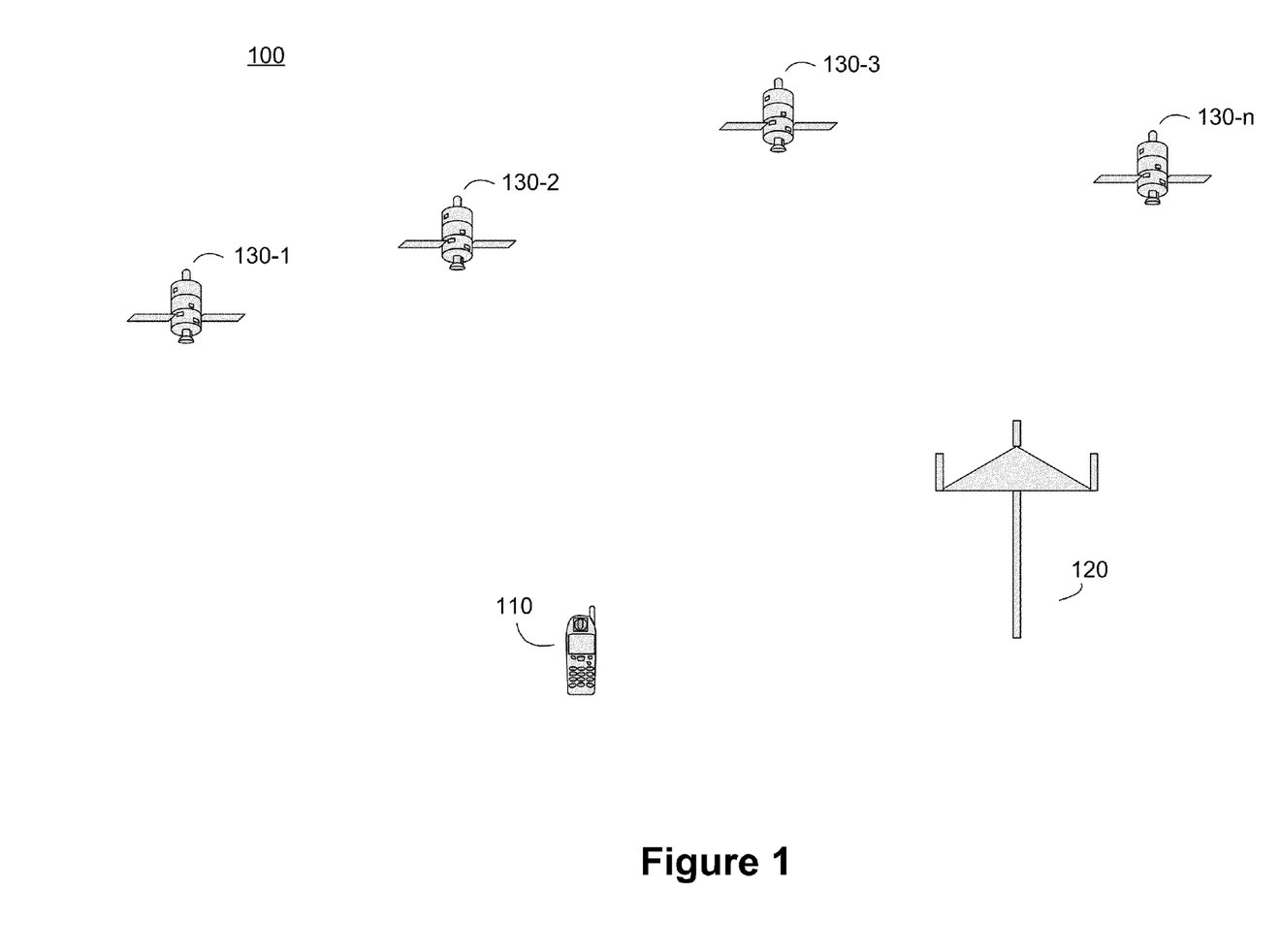
FIG. 1 is a simplified system diagram of an embodiment of a position location system.

FIG. 1 is a simplified system diagram of an embodiment of a position location system 100. The position location system 100 includes a plurality of satellites 130. The position location system 100 can also include one or more terrestrial beacons 120, pseudolites, or other signal transmitters. In the embodiment of FIG. 1, the terrestrial beacon 120 is depicted as a base station, such as a base station of a wireless communication system. The base station can provide, for example, timing signals that may be used in a hybrid position location system, such as hybrid GPS. Alternatively, or additionally, the base station can be a source of an initial position location for reducing a position uncertainty and can be configured to provide assistance data, such as GPS assistance data. The assistance data can include, but is not limited to, identities of satellites above the horizon, suggested code phase search starting points and/or ranges, GPS almanac data, satellite ephemeris data, and the like, or some combination thereof.

A wireless device 110 can determine its position if it is in receipt of two distinct timing signals. Although the discussion focuses on location determination based solely on satellite vehicle signals, some position location systems or variants of position location systems, such as Hybrid GPS, can utilize signals from the terrestrial beacon 120 as part of position determination.

The wireless device 110 can receive pseudo random code spread signals from each of at least two satellite vehicles, e.g. 130-1 and 130-n, that are part of a constellation of satellites, such as the GPS constellation of satellites. The number of distinct satellite signals required by the wireless device 110 for a valid position fix is based on the amount of additional position relevant information available to the wireless device 110. As noted above, where the wireless device 110 determines a three-dimensional position fix solely based on the signals from the satellites vehicles, the wireless device 110 requires signals from at least four distinct satellite vehicles, 130-1, 130-2, 130-3, and 130-n. The wireless device 110 may require signals from as few as two distinct satellite vehicles, e.g. 130-1 and 130-n, where the wireless device 110 has knowledge of or can otherwise determine additional position relevant information.

The wireless device 110 can correlate the received signals against locally generated versions of the pseudo noise code sequences that may be frequency offset to account for Doppler shifts. The wireless device 110 can identify the satellites based on the correlation results.

The wireless device 110 can also determine relative bit edge transitions for each of the satellite signals. The bit edge transitions occur at the transitions of the underlying information modulated onto the satellite signals. The underlying information can include, for example, a navigation message, almanac data, satellite ephemeris data, and time reference or time stamp information. The wireless device can typically accurately determine the bit edge transitions, and can improve the sensitivity of bit edge transition determination by increasing the integration time of the received signal. In a GPS satellite signal as well as a GLONASS satellite signal, the underlying data occurs at a 50 Hz rate, thus the bit edge transitions may occur each 20 milliseconds. In the proposed Galileo satellite system, the bit durations occur at 4 millisecond intervals.

The wireless device 110 can attempt to demodulate the underlying message and decode the time message from each of the satellites 130. The time message in a GPS pseudo random code spread signal repeats every six seconds. Thus, the opportunity to decode the time message occurs only once in each six second interval. However, the wireless device 110 may be unable to successfully decode the time message information from all of the satellites 130, for example, due to weak satellite signals. The wireless device 110 can make an accurate position determination if it is able to decode at least one time message in addition to identifying relative bit edge transition timing for at least one other satellite vehicle.

Assume that the wireless device 110 is able to successfully decode the time message from the signals from the first satellite vehicle 130-1. The wireless device 110 can utilize the time message as a time reference to which the time of the bit edge transitions for that satellite vehicle can be associated. Thus, the wireless device 110 has knowledge of the bit edge transition timing based on the ability to decode the timing message.

Because the wireless device 110 also knows the relative bit edge transition timing for each of the satellite vehicles for which a time message has yet to be decoded, the wireless device 110 can determine a time of each bit edge transition relative to known bit edge transitions for the first satellite vehicle 130-1.

The timing of the signals from each of the satellite vehicles 130-1 through 130-n is synchronized to the same GPS time base. However, the signals arriving at the wireless device 110 may vary over time due to different propagation delays experienced by the different satellite signals. Therefore, although the wireless device 110 knows the time of the bit edge transitions for the first satellite 130-1 from decoding the timing message, the wireless device does not know if the signals from each of the other satellite vehicles leads or lags the signal from the first satellite vehicle 130-1. Thus, the wireless device is unable to immediately derive a time of each bit edge transition for the second through nth satellites 130-2 through 130-n. The wireless device 110 is only able to immediately determine a time of each bit transition with an error in multiples of 20 milliseconds.

The wireless device 110 can resolve the ambiguity in the bit edge transitions by windowing the bit edge transitions and hypothesis testing. The wireless device 110 can impose a window on the bit edge transitions having a duration that is less than an expected time variation.

Empirical studies and modeling has revealed that the propagation delay from a GPS satellite vehicle to virtually any point on the earth where that satellite is visible varies from an absolute minimum of about 65 milliseconds to an absolute maximum of about 88 milliseconds, provided the satellites are above a zero degree horizon. It is unlikely that the same position will simultaneously experience both the minimum and maximum satellite propagation delays. However, the window can be set based on the differences in the maximum propagation delay and minimum propagation delay. Thus, the window size can be less than approximately 22 milliseconds, less than approximately 23 milliseconds, or some other value. Utilizing insufficient window duration may result in the inability to determine a time hypothesis that results in a valid position determination. However, extending the window time excessively creates numerous time hypotheses to verify that will not reasonably result in a valid position determination. The window size of approximately 20, 21 or 22 milliseconds is convenient, not just because it encompasses substantially the entire range of propagation delays, but because the duration is on the order of the single bit period of 20 milliseconds. Thus, repositioning a window size of approximately 20, 21 or 22 milliseconds across all possibilities results in, at the most, three different bit edge transitions from a single satellite vehicle that need to be accounted for in time hypotheses testing.

The wireless device 110 positions the window about the bit edge transitions for each of the received satellite signals, and positions the window to include at least one known bit edge transition from the first satellite 130-1. The wireless device 110 can then determine a set of time hypothesis based on the location of the window, the time of the known bit edge transition, and the positions of the bit edge transitions for the other satellites relative to the known bit edge transition.

In one embodiment, the wireless device 110 hypothesizes a timing of each unknown bit edge transition timing occurring nearest the known bit edge time to the time of the known bit edge time. The wireless device 110 determines a position solution for the time hypothesis. The wireless device 110 can implement, for example, virtually any type of position solution based on pseudo range measurements. The wireless device 110 can have knowledge of the satellite positions based on, for example, valid ephemeris data for the satellites or based on a satellite orbit prediction algorithm.

The wireless device 110 can implement, for example, an iterative position solution technique, such as, weighted least squares, minimum least squares, weighted regression, Kalman filtering, and the like, or some combination thereof. The wireless device 110 can validate the position solution. If the position solution is successfully validated, it is the position solution for the wireless device 110. However, if the position solution is not valid, the wireless device 110 shifts or otherwise updates the position of the window and updates the time hypothesis. The wireless device 110 repeats the position solution and validation process followed by the window repositioning process until all distinct window placements and time hypothesis have been tested, or until a valid position solution is determined.

Figure 2:
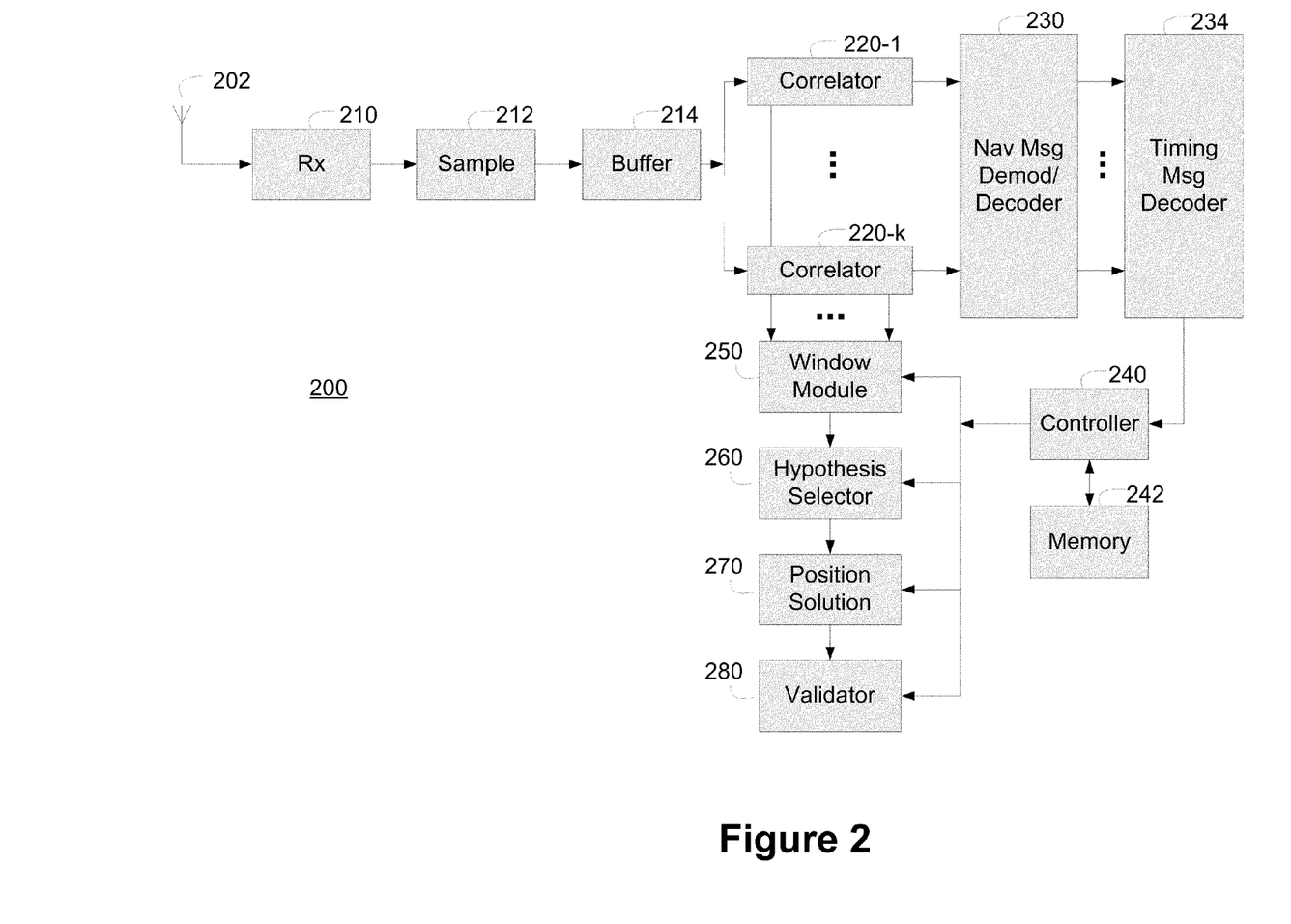
FIG. 2 is a simplified functional block diagram of an embodiment of a position location receiver.

FIG. 2 is a simplified functional block diagram of an embodiment of a position location receiver 200. The position location receiver 200 can be implemented, for example, within the wireless device of FIG. 1 to perform position location.

The receiver 200 includes an antenna 202 coupled to a receive front end 210. The output of the receive front end is coupled to a sampler 212. The output of the sampler 212 is coupled to a buffer 214.

The receive front end 210 is configured to tune to the nominal receive frequency of the GPS satellite signals to receive a composite signal that can include a plurality of pseudo noise code spread signals corresponding to a plurality of satellite vehicles. The receive front end 210 filters, amplifies, and frequency converts the composite received signal. The sampler 212 can be configured to sample the receive front end output and convert an analog signal output from the receive front end to a digital representation. The sampler 212 can be configured to sample the received signals at a rate that is higher than the chip rate associated with the pseudo noise code. For example, the sampler 212 can be configured to sample at the chip rate, twice the chip rate, four times the chip rate, or some other multiple or non-multiple of the chip rate. The sampler 212 can be configured to store the samples in the buffer 214.

The buffer 214 contents may be accessed by a plurality of correlators 220-1 through 220-k, which can be configured substantially in parallel to accelerate signal acquisition. Each correlator 220 can be configured to search a distinct pseudo noise code space. Alternatively, multiple correlators 220 may be configured to search the same pseudo noise code space, but may operate on distinct samples from the buffer 214. In some embodiments, different subsets of correlators 220 are configured for distinct pseudo noise code space searches across different groups of samples from the buffer 214. Each correlator 220 can determine a code phase offset for a particular code phase, and can also determine a bit edge transition for the particular satellite signal associated with the pseudo noise code for which the correlator 220 is configured.

The output from the correlators 220 are coupled to a navigation message demod/decoder 230 that can be configured to decode the navigation message from each of the satellite vehicles for which a signal is detected. The navigation message decoder 230 can be coupled to a timing message decoder 234 that can examine the successfully demodulated and decoded navigation messages and attempt to decode a timing message from them.

The timing message decoder 234 can be coupled to a controller 240. The timing message decoder 234 can inform or otherwise communicate the timing message information and associated satellite vehicle information to the controller 240. Based on the timing message information, the controller 240 can assign or otherwise determine a time of bit edge transitions from the satellite vehicle corresponding to the timing message. The time of the bit edge transition can represent a propagation delay from the satellite vehicle to the receiver 200. The controller 240 need not, at this time, resolve any ambiguity in the absolute time of the bit edge transition timing, but instead may select a bit edge transition timing such that the total propagation delay measured at the receiver 200 is near the center of the expected propagation delay range. The actual bit edge transition timing can be resolved when the position solution is determined.

The controller 240 can be in communication with a computer readable media, such as memory 242. The memory can store one or more computer readable instructions that cause the controller to perform substantially some or all of the methods described herein. In some implementations, the controller 240, in combination with the instructions in memory 242, can be configured to perform some or all of the functions of the window module 250, hypothesis selector 260, position solution module 270, and validator 280.

A window module 250 is coupled to each correlator 220 and receives the bit edge transition information from the correlators 220. The window module 250 can be configured to filter or otherwise select only those bit edge transitions that occur within the duration of the window.

The controller 240 can be configured to initially position the window based on the position of the time-known bit edge transition. The controller 240 or the window module 250 can reposition the window following determination of invalid timing hypotheses.

The hypothesis selector 260 is configured to receive the bit edge transitions, pointers to the bit edge transitions, or the identities of the bit edge transitions, from the window module 250. The hypothesis selector 260 can be configured to set a timing for each of the bit edges within the window based on the time of the known bit edge transition. In one embodiment, the hypothesis selector 260 sets each bit edge transition within the window based on the time of the known bit edge transition. If more than one bit edge transition for the same satellite vehicle lies within the window, the hypothesis selector 260 can use an arbitration rule. For example, the hypothesis selector 260 can be configured to set the bit edge transition occurring nearest the known bit edge transition based on the time of the known bit edge transition.

The position solution module 270 is configured to determine a position solution based on the timing hypothesis set by the hypothesis selector 260. At this point, the pseudo range measurements for the various satellites are not distinguishable to the position solution module 270 over pseudo range measurements obtained using a conventional approach. Thus, the position solution module 270 can be configured to determine a position solution using a conventional technique, such as a position solution technique that may include weighted least squares, minimum least squares, weighted regression, Kalman filtering, and the like, or some combination thereof.

The position solution module 270 can determine the solution in conjunction with satellite position information that can be stored in memory 242. The satellite position information can be stored, for example, as one or more of a satellite almanac, satellite ephemeris, a satellite orbit prediction function, or some combination thereof.

A validator 280 processes the result from the position solution module 270 to determine if the solution is valid. If so, the processing is complete and the position of the receiver 200 is determined. If the position solution is invalid, the window module repositions the window, and the hypothesis selector 260 generates another timing hypothesis to be tested. The validator 280 can determine an invalid solution, for example, if an iterative position solution algorithm fails to converge after some predetermined number of iterations.

Figure 3:
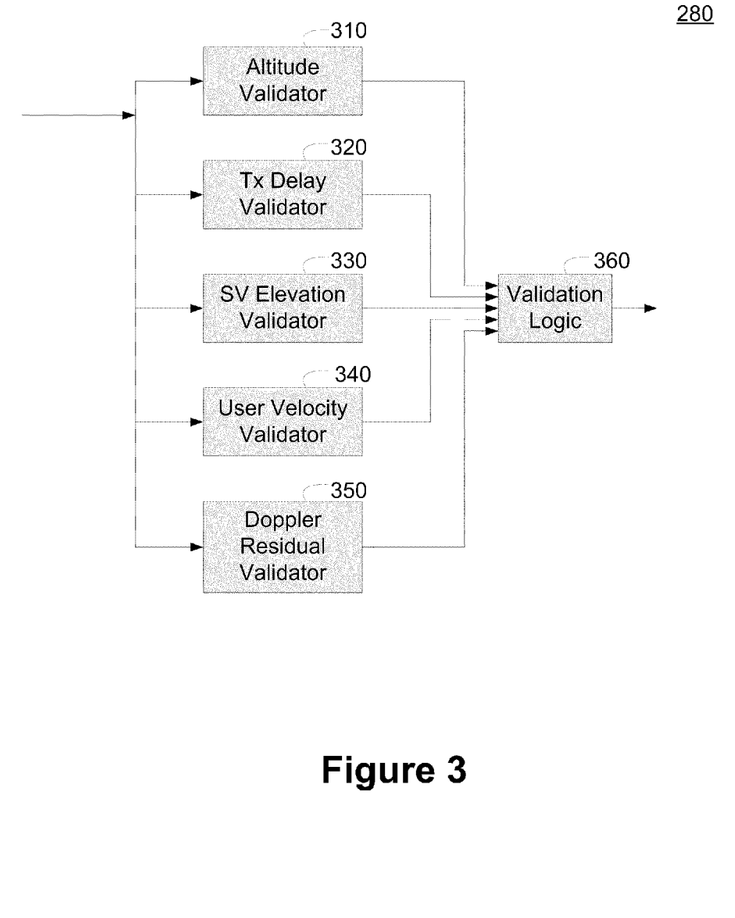
FIG. 3 is a simplified functional block diagram of an embodiment of a validation module.

FIG. 3 is a simplified functional block diagram of an embodiment of a validator 280. The validator 280 can be, for example, the validator in the receiver of FIG. 2. The validator 280 receives position solution information from the position solution module and processes the information according to a number of constraints in order to determine validity of the position solution.

The validator 280 may include an altitude validator 310, a transmit delay validator 320, a satellite vehicle elevation validator 330, a user velocity validator 340, a Doppler residual validator 350, or some combination thereof. Each of the validator 280 modules operates independently of one another, or one or more may be dependent on each other. The number and type of modules within the validator 280 are not limited to those types and arrangements illustrated in the embodiment of FIG. 3.

The altitude validator 310 can examine the position solution and compare the altitude of the position solution against limits for minimum and maximum altitudes. For example, the altitude validator 310 can include some depth below sea level for which valid altitudes may not fall beneath. Similarly, the altitude validator 310 can include a predetermined altitude which may not be exceeded by valid altitude position solutions. Altitudes falling beyond the predetermined range are identified as invalid solutions.

In those situations where the receiver has knowledge of altitude or otherwise is configured to determine a two-dimensional position fix, the altitude validator 310 may be omitted, deactivated, or otherwise ignored.

Similarly, the transmit delay validator 320 examines the propagation delays for the corrected timing, as determined from the position solution, and determines if any propagation delay falls outside of a predetermined range. As an example, the range of propagation delays for any point on the earth is estimated to range from approximately 65 milliseconds to 88 milliseconds provided the satellite vehicles are above a zero degree horizon. The transmit delay validator 320 can identify the solution as invalid if the corrected propagation delays from the position solution fall outside this range.

The satellite vehicle elevation validator 330 can determine if all of the satellite vehicles utilized in the position solution are above a zero degree horizon. The satellite vehicle elevation validator 330 can examine the position solution against the assumed positions of the satellite vehicles used to produce the position solution. The elevation angle of the satellite vehicles can be determined based on the knowledge of the position solution and the assumed satellite position. The SV elevation validator 330 can identify the solution as invalid if any of the satellite vehicle elevation angles are less than zero.

The user velocity validator 340 can compute a velocity of the wireless device based on the position solution and the Doppler values from each of the four satellite vehicles. A velocity outside of a predetermined range can result in the user velocity validator identifying the position solution as invalid.

A Doppler residual validator 350 compares a computed versus a measured pseudo range rate. The Doppler residual validator 350 can compare a measured Doppler against a theoretical Doppler based on the position solution and determine if the residual is greater than a predetermined threshold. The Doppler residual validator 350 can identify the position solution as invalid if the residual lies outside a predetermined range.

Although each validator may identify the position solution as invalid independent of another validator, the validator output values are all provided to validation logic 360 that can make an ultimate decision as to the validity of a position solution based on one or more indications of invalidity. The validation logic can be configured, for example, to indicate invalid result of a single invalid indication, a plurality of invalid indication, or based on predetermined combinations of invalid indications or weighted combinations of invalid indications.

Figure 4:
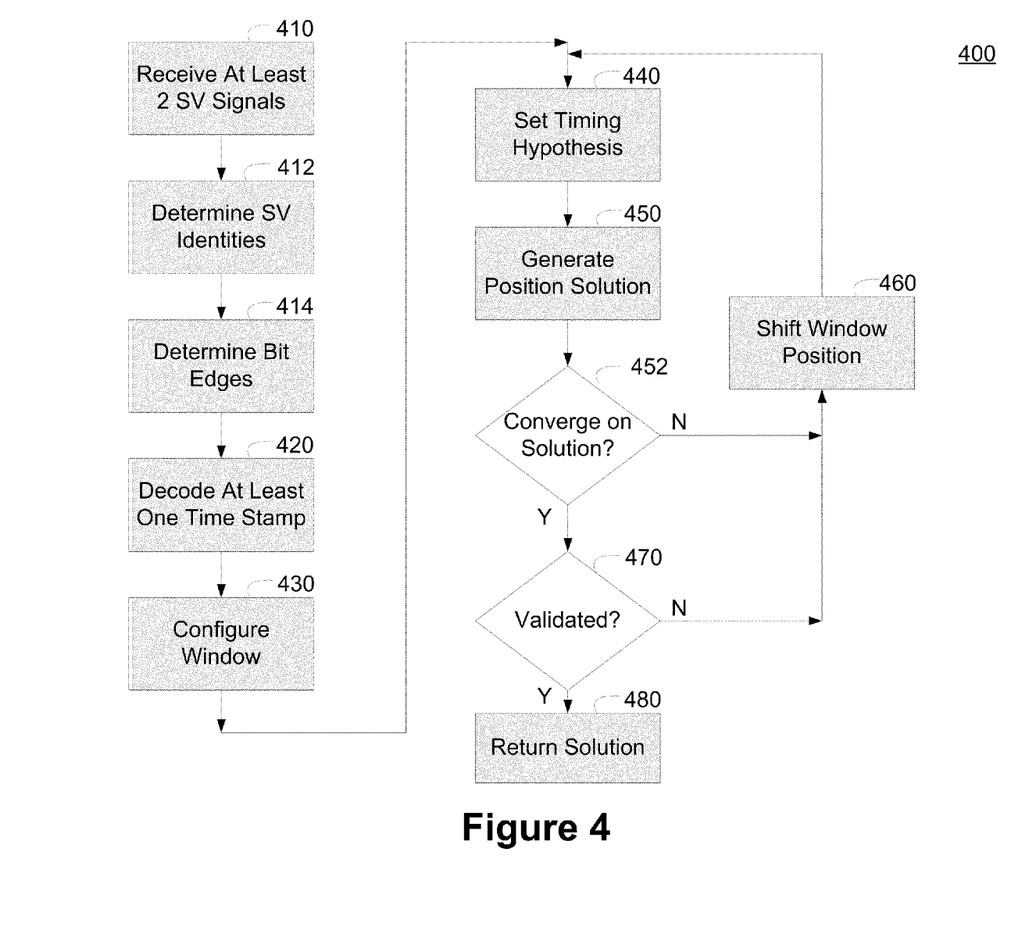
FIG. 4 is a simplified flowchart of an embodiment of a method of position location using hypothesis time setting.

FIG. 4 is a simplified flowchart of an embodiment of a method 400 of position location using hypothesis time setting. The method 400 can be implemented, for example, by the receiver of FIG. 2 in the wireless device of FIG. 1.

The method 400 begins at block 410, where the receiver receives at least two satellite vehicle pseudo noise code spread signals. The receiver proceeds to block 412 and determines the satellite vehicle identities, for example, by correlating the received signals against locally generated versions of the pseudo noise code sequence.

The receiver proceeds to block 414 and determines the bit edge transitions for each of the at least two satellite vehicle signals. The receiver can determine the bit edge transitions using correlation and may integrate over several complete pseudo noise code periods in order to improve detection sensitivity.

The receiver proceeds to block 420 and decodes at least one time stamp or otherwise determines a time reference associated with at least one of the satellite vehicle signals. The receiver can, for example, demodulate a navigation message and decode a time message from the satellite vehicle signal.

The receiver needs to determine at least one time reference in order to successfully execute the method 400. However, the number of ambiguous time hypothesis that need to be examined is reduced with each additional time reference. At the limit of four time references, for a generalized solution based solely on satellite vehicle signals, the method 400 is no longer necessary, and the receiver can directly determine the pseudo ranges. However, the receiver may still utilize the method to enable position solution verification using a fifth satellite vehicle signal for which time reference is not needed.

The receiver proceeds to block 430 and configures a time window about the bit edge transitions based on the position of the known bit edge transition corresponding to the satellite vehicle for which the time reference is known. The duration of the window can be selected to be approximately a duration that matches the difference between the maximum and minimum satellite vehicle propagation delays. As an example, the window can have a duration of less than about 22 milliseconds.

The receiver proceeds to block 440 and determines a timing hypothesis for the bit edge transitions within the window. The receiver can, for example, assume each of the bit edge transitions in the window occurs based on the time of the known bit edge transition.

The receiver proceeds to block 450 and determines a position solution based on the pseudo range measurements and knowledge of the locations of the satellite vehicles determined, for example, based on an almanac, satellite ephemeris data, satellite orbit prediction, or some combination thereof The position solution may also rely on relevant position information, if any, that is available to the receiver. Such relevant position information can include, for example, an estimate of the altitude of the receiver, a Doppler measurement observed at the receiver in combination with the corresponding pseudoranges, and the like, or some combination thereof.

The receiver can determine a position, for example, based on an iterative position determination algorithm, such as a weighted least squares algorithm. The receiver proceeds to decision block 452 to determine if the position determination algorithm converged on a solution. If not, the solution is invalid. The receiver proceeds to block 460.

If, at decision block 452, the receiver determines that the position determination algorithm returned a position solution, the receiver proceeds to decision block 470 and determines if the solution passes a validation process. If not, the receiver proceeds to block 460.

At block 460, the receiver shifts or otherwise reconfigures the window position to capture a different set of bit edge transition hypotheses. The receiver returns from block 460 to block 440 to repeat the timing hypothesis/position solution process.

If, at decision block 470, the position solution satisfies the validation process, the receiver proceeds to block 480 to return the position solution as the location of the receiver.

Figure 5:
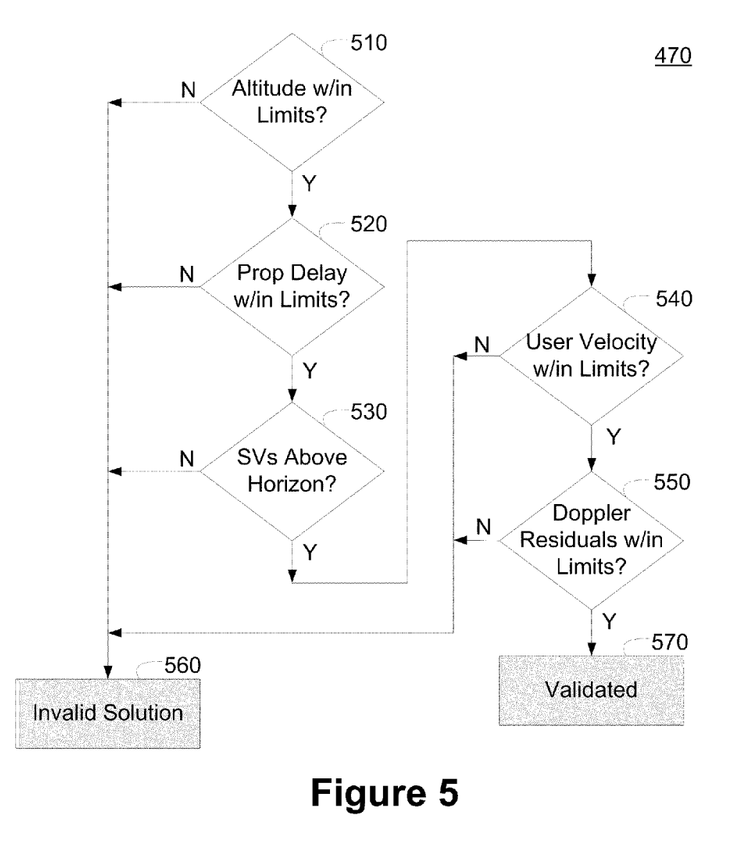
FIG. 5 is a simplified flowchart of an embodiment of a method of position solution validation.

FIG. 5 is a simplified flowchart of an embodiment of a method 470 of position solution validation. The method 470 can be implemented by a receiver executing the method of FIG. 5.

The method 470 begins at decision block 510, where the receiver determines if the position solution includes an altitude within predetermined limits. If not, the receiver proceeds to block 560 and identifies the solution as invalid.

If the receiver determines the altitude constraints are satisfied, the receiver proceeds to decision block 520 to determine if the propagation delays from the satellite vehicles used in the position solution determination are within predetermined range of values. If not, the receiver proceeds to block 560 to identify the solution as invalid. This step of determining if the position solution altitude is within limits is, of course, bypassed when the receiver performs a 2D position solution using a known or given altitude.

If the receiver determines the propagation delay constraints are met, the receiver proceeds to decision block 530 to determine if the satellite vehicles used in the position solution are above the horizon for a device positioned at the location of the position solution. If not, the receiver proceeds to block 560 to identify the solution as invalid.

If the receiver determines the satellite vehicle elevation constraints are met, the receiver proceeds to decision block 540 to determine if the user velocity falls within a predetermined range or limit. If not, the receiver proceeds to block 560 to identify the solution as invalid.

If the receiver determines that the user velocity satisfies the velocity constraints, the receiver proceeds to decision block 550 to determine if Doppler residuals are within predetermined limits. The receiver can compare a measured Doppler against a theoretical Doppler based on the position solution and the receiver clock frequency bias, and determine if the residual is greater than a predetermined threshold. If so, the receiver proceeds to block 560 to identify the solution as invalid. Otherwise, the receiver proceeds to block 570 and identifies the position solution as valid.

Figure 6:
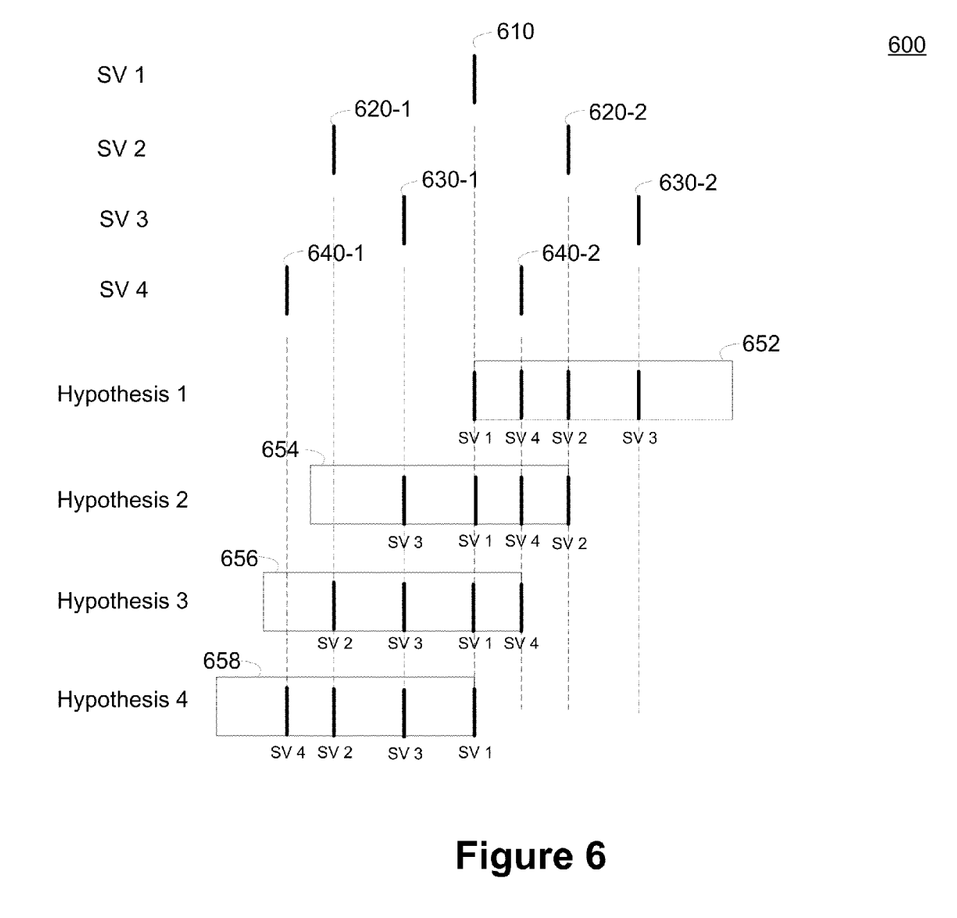
FIG. 6 is a simplified timing diagram of an example of a position solution using hypothesis time setting.

FIG. 6 is a simplified timing diagram 600 of an example of a position solution using hypothesis time setting. The timing diagram 600 illustrates bit edge transitions for four satellite vehicles, and the four possible timing hypothesis that may be generated for a predetermined window duration of approximately 22 milliseconds.

The first satellite vehicle is assumed to be the satellite vehicle for which the time reference is known. Thus, the first SV bit edge transition 610 is a known and time unambiguous bit edge transition, and only one bit edge transition need be illustrated. The time of the adjacent bit edge transitions for the first SV can be determined by subtracting or adding 20 milliseconds to the known bit edge transition, where 20 milliseconds is the period of each bit.

A second satellite vehicle has two bit edge transitions 620-1 and 620-2 that can be identified relative to the first SV known bit edge transition 610. However, there is an ambiguity as to whether the earlier bit edge transition, 620-1 or the later bit edge transition 620-2 is synchronized to the known bit edge transition 610.

Similarly, two bit edge transitions 630-1 and 630-2 for a third satellite vehicle are shown relative to the first SV known bit edge transition 610. Two bit edge transitions 640-1 and 640-2 for a fourth are shown relative to the first SV known bit edge transition 610.

A first timing hypothesis is illustrated based on a first position of a time window 652. Each bit transition, 610, 640-2, 620-2, and 630-2, within the window 652 is set relative to the time of the first SV known bit edge transition. The position solution can be determined based on the pseudo range from each satellite vehicle from the timing hypothesis.

A second timing hypothesis is illustrated based on a second position of a time window 654. The time window is shifted to capture at least one distinct bit edge transition not in the first position of the window. The bit transitions, 630-1, 610, 640-2 and 620-2, within the second position of the time window 654 are set relative to the time of the first SV known bit edge transition. The position solution can be determined based on the pseudo range from each satellite vehicle from the second timing hypothesis.

A third timing hypothesis is illustrated based on a third position of a time window 656. The time window is shifted to capture at least one distinct bit edge transition. The bit transitions, 620-1, 630-1, 610, and 640-2, within the third position of the time window 656 are set relative to the time of the first SV known bit edge transition. The position solution can be determined based on the pseudo range from each satellite vehicle from the third timing hypothesis.

A fourth timing hypothesis is illustrated based on a fourth position of a time window 658. The time window is shifted to capture at least one distinct bit edge transition. The bit transitions, 640-1, 620-1, 630-1, and 610, within the fourth position of the time window 658 are set relative to the time of the first SV known bit edge transition. The position solution can be determined based on the pseudo range from each satellite vehicle from the fourth timing hypothesis.

Note that there are only four possible timing hypotheses using a window of the duration shown in FIG. 6. A further shift of the time window would exclude the known bit edge transition. Thus, the receiver would need to attempt, at most, four position solutions, based on the four timing hypotheses, before determining the correct position solution.

Figure 7:
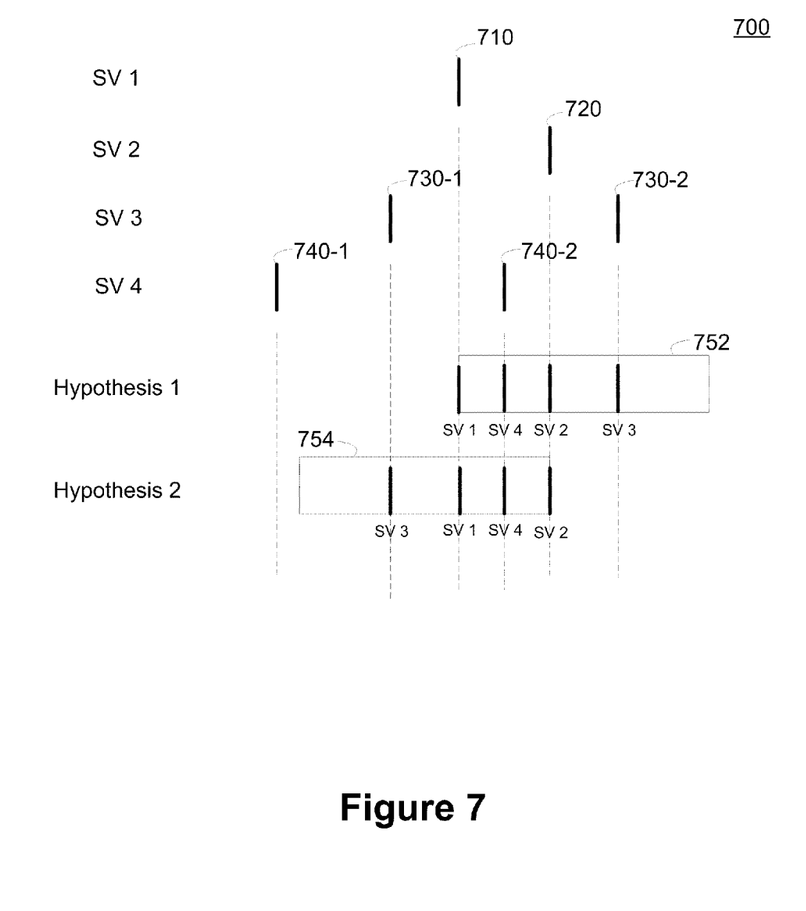
FIG. 7 is a simplified timing diagram of an example of a position solution using hypothesis time setting.

FIG. 7 is a simplified timing diagram 700 of an example of a position solution using hypothesis time setting. The timing diagram 700 of FIG. 7 illustrates two known time references for two satellite vehicles. The timing diagram 700 illustrates how the additional knowledge of the second time reference reduces the number of possible timing hypotheses to only two, when a time window has a duration on the order shown.

The timing diagram 700 illustrates a first bit edge transition 710 for a first satellite vehicle for which the time reference is known. Similarly, a second bit edge transition 720 is shown for a second satellite vehicle for which a time reference is known.

The ambiguous bit edge transitions 730-1 and 730-2 for a third satellite vehicle are shown, as well as the ambiguous bit edge transitions 740-1 and 740-2 for a fourth satellite vehicle. The time reference has not or cannot be determined for the third and fourth satellite vehicles.

A first timing hypothesis can be generated by positioning a first time window 752 to capture at least the first and second known bit edge transitions, 710 and 720, as well as at least one bit edge transition 740-2 and 730-2 from each of the satellite vehicles lacking a known time reference.

A second timing hypothesis can be generated by positioning a second time window 754 to capture at least the first and second known bit edge transitions, 710 and 720, as well as at least one bit edge transition 730-1 and 740-2 from each of the satellite vehicles lacking a known time reference. As shown in FIG. 7, these are the only two possible timing hypotheses for the time window of this size and the positions of the known bit edge transitions 710 and 720. A further shift of the time window would eliminate one of the known bit edge transitions from the window.

Methods and apparatus are described herein for determining a position location solution when as few as one time reference for a plurality of SPS satellite signals are known, but where bit edge transitions for at least four satellite signals are known and satellite position information is available. The methods and apparatus enable a receiver to determine a position solution in poor coverage environments, where the time information in the navigation message for a plurality of satellite signals cannot be demodulated.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

In one or more exemplary embodiments, the functions described may be implemented in hardware, software, firmware, or any combination thereof. If implemented in software or firmware, the functions may be stored on a physical computer-readable medium as one or more instructions, information, or code encoded therein. Computer-readable media includes physical computer storage media. A storage medium may be any available physical medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of position location in a wireless receiver, the method comprising:
   receiving a pseudo noise code spread signal from each of at least two satellite vehicles;
   determining a relative bit transition edge timing for each pseudo noise code spread signal relative to at least one other of the pseudo noise code spread signals;
   determining a time reference for at least a first one of the pseudo noise code spread signals for at least a corresponding first one of the at least two satellite vehicles; and
   determining a position location solution for the wireless device based on the time reference and the relative bit transition edge timing for the pseudo noise code spread signal for each of the at least two satellite vehicles other than the at least a corresponding first one of the at least two satellite vehicles.

2. The method of claim 1, further comprising correlating the pseudo noise code spread signals with a locally generated pseudo noise code sequence to identify the at least two satellite vehicles.

3. The method of claim 1, further comprising determining a time associated with a bit edge related to the time reference.

4. The method of claim I, wherein receiving the pseudo noise code spread signal comprises receiving a Global Positioning System navigation message spread by a pseudo noise code corresponding to a satellite vehicle.

5. The method of claim 1, wherein determining the bit transition edge timing comprises:
   correlating the pseudo noise code spread signal with a locally generated pseudo noise code sequence; and
   determining a transition timing of a correlation phase inversion.

6. The method of claim 1, wherein determining the time reference comprises decoding some or all of a navigation message from at least one of the pseudo noise code spread signals.

7. A method of position location in a wireless receiver, the method comprising:
   receiving a pseudo noise code spread signal from each of at least two satellite vehicles:
   determining a bit transition edge timing for each pseudo noise code spread signal;
   determining a time reference for at least one of the pseudo noise code spread signals; and
   determining a position location solution for the wireless device based on the time reference and bit transition edge timing for the pseudo noise code spread signal from each of the at least two satellite vehicles;
   wherein determining the position location solution comprises:
   determining a known time associated With a bit edge related to the time reference;
   configuring a time window encompassing a bit transition of the pseudo noise code spread signal from each of the at least two satellite vehicles;
   generating a time hypothesis for at least one bit transition within the window for the signal from at least one satellite vehicle for which a time reference is unknown; and determining the position location solution based on the known time and the time hypothesis.

8. The method of claim 7, further comprising:
shifting a position of the time window;
generating an updated time hypothesis; and
determining an updated position location solution based on the known time and the updated time hypothesis.

9. The method of claim 1, further comprising validating the position location solution.

10. The method of claim 9, wherein validating the solution comprises at least one of altitude validation, transmitter propagation delay validation, satellite vehicle elevation validation; device velocity validation; and Doppler residual validation.

11. The method of claim 9, wherein validating the solution comprises determining if an iterative position solution converges within a predetermined number of iterations.

12. A method of position location in a wireless receiver, the method comprising:
receiving a pseudo noise code spread signal from each of at least two pseudo noise code spread signal transmitters;
determining a bit transition edge timing for each pseudo noise code spread signal;
determining a time reference for a first pseudo noise code spread signal;
determining a time associated with a first bit transition for the first pseudo noise code spread signal;
configuring a time window that captures the first bit transition and at least one bit transition from a second pseudo noise code spread signal for which a time reference is unknown;
generating a time hypothesis for the at least one bit transition from the second pseudo noise code spread signal;
determining a position location solution for the wireless device based on the time associated with the first hit transition and the time hypothesis for the at least one bit transition from the second pseudo noise code spread signal; and
validating the position location solution.

13. The method of claim 12, further comprising:
shifting a position of the time window;
generating an updated time hypothesis; and
determining an updated position location solution based on the time associated with the first bit transition and the updated time hypothesis.

14. The method of claim 12, wherein configuring the time window comprises configuring a time window of less than 22 milliseconds duration.

15. A method of position location in a wireless receiver, the method comprising:
determining relative timing of bit edge transitions for each of a plurality of Satellite Positioning System (SPS) signals;
determining a time reference for at least one bit edge transition for a corresponding at least one of the plurality of SPS signals;
generating a time hypothesis for the plurality of bit edge transitions based on the time reference and the relative timing of bit edge transitions for each of the plurality of SPS signals; and
determining a position location solution based on the time hypothesis.

16. A position location apparatus within a wireless device, the apparatus comprising:
a receiver configured to receive a plurality of pseudo noise code spread signals from a plurality of Satellite Positioning System satellite vehicles;
a correlator configured to determine a timing of bit edge transitions from each of the plurality of pseudo noise code spread signals;
a timing message decoder configured to determine a time reference for at least one of the pseudo noise code spread signals;
a hypothesis selector configured to determine a time hypothesis for a bit edge from each of the plurality of pseudo noise code spread signals based on relative timing of bit edge transitions between pairs of the plurality of pseudo noise code spread signals and the time reference; and
a position solution module configured to determine a position location solution based on the time reference and the time hypothesis for the bit edge from each of the plurality of pseudo noise code spread signals.

17. The apparatus of claim 16, further comprising:
a window module configured to determine a time window in which at least one bit edge occurs from each of at least two pseudo noise code spread signals, and
wherein the hypothesis selector determines the time hypothesis for bit edges occurring within the time window.

18. The apparatus of claim 17, wherein the time window comprises a time window of less than 22 milliseconds duration.

19. The apparatus of claim 16, further comprising a validator configured to validate the position location solution based on at least one predetermined constraint.

20. The apparatus of claim 19, wherein the at least one predetermined constraint comprises at least one of an altitude constraint, a transmitter propagation delay constraint, a satellite vehicle elevation constraint, a device velocity constraint, and a Doppler residual constraint.

21. The apparatus of claim 16, wherein the hypothesis selector updates the time hypothesis for the bit edge from each of the plurality of pseudo noise code spread signals if the validator indicates an invalid position solution.

22. The apparatus of claim 16, wherein the timing message decoder determines the time reference by decoding a message encoded on a first of the plurality of pseudo noise code spread signals.

23. The apparatus of claim 16, wherein the hypothesis selector sets the time associated with a bit edge from each of the plurality of pseudo noise code spread signals to a same time.

24. The apparatus of claim 23, wherein the same time is determined based on the time reference and a first bit edge for the at least one of the pseudo noise code spread signals for which the time reference is associated.

25. A position location apparatus within a wireless device, the apparatus comprising:
means for receiving a pseudo noise code spread signal from each of at least two satellite vehicles;
means for determining a relative bit transition edge timing for each pseudo noise code spread signal relative to at least one other of the pseudo noise code spread signals;
means for determining a time reference for at least a first one of the pseudo noise code spread signals for at least a corresponding first one of the at least two satellite vehicles; and
means for determining a position location solution for the wireless device based on the time reference and the relative bit transition edge timing for the pseudo noise code spread signal for each of the at least two satellite vehicles other than the at least a corresponding first one of the at least two satellite vehicles.

26. A position location apparatus within a wireless device, the apparatus comprising:
- means for receiving a pseudo noise code spread signal from each of at least two satellite vehicles:
- means for determining a bit transition edge timing for each pseudo noise code spread signal;
- means for determining a time reference for at least one of the pseudo noise code spread signals; and
- means for determining a position location solution for the wireless device based on the time reference and bit transition edge timing for the pseudo noise code spread signal from each of the at least two satellite vehicles;
- wherein the means for determining the position location solution comprises:
- means for determining a known time associated with a bit edge related to the time reference;
- means for configuring a time window encompassing a bit transition of the pseudo noise code spread signal from each of the at least two satellite vehicles;
- means for generating a time hypothesis for at least one bit transition within the window for the signal from at least one satellite vehicle for which a time reference is unknown; and
- means for determining the position location solution based on the known time and the time hypothesis.

27. The apparatus of claim 26, further comprising:
- means for shifting a position of the time window;
- means for generating an updated time hypothesis; and
- means for determining an updated position location solution based on the time associated with the first bit transition and the updated time hypothesis.

28. The apparatus of claim 25, further comprising means for validating the position location solution.

29. A computer readable medium encoded with one or more computer readable instructions, when executed by the computer cause the computer to perform the acts of:
- determining a relative bit transition edge timing for each pseudo noise code spread signal from a plurality of pseudo noise code spread signals, each relative bit transition edge timing being relative to at least one other of the pseudo noise code spread signals;
- determining a time reference for at least a first one of the plurality of pseudo noise code spread signals; and
- determining a position location solution for a wireless device based on the time reference and the relative bit transition edge timing for each of the pseudo noise code spread signals other than the first one of the plurality of pseudo noise code spread signals.

* * * * *